(12) United States Patent
Ahn et al.

(10) Patent No.: US 9,171,383 B2
(45) Date of Patent: Oct. 27, 2015

(54) APPARATUS AND METHOD OF SCALABLE ENCODING OF 3D MESH, AND APPARATUS AND METHOD OF SCALABLE DECODING OF 3D MESH

(75) Inventors: Min Su Ahn, Seoul (KR); Chang Su Kim, Seoul (KR); Jae Kyun Ahn, Seoul (KR); Do Kyoon Kim, Seongnam-si (KR); Dae Youn Lee, Seoul (KR)

(73) Assignees: Samsung Electronics Co., Ltd., Suwon-si (KR); Korea University Industrial & Academic Collaboration Foundation, Seoul (KR)

( * ) Notice: Subject to any disclaimer, the term of this patent is extended or adjusted under 35 U.S.C. 154(b) by 825 days.

(21) Appl. No.: 13/159,912

(22) Filed: Jun. 14, 2011

(65) Prior Publication Data
US 2012/0013608 A1   Jan. 19, 2012

(30) Foreign Application Priority Data

Jul. 19, 2010   (KR) ........................ 10-2010-0069581

(51) Int. Cl.
*G06T 15/00*   (2011.01)
*G06T 9/00*   (2006.01)
*H04N 19/184*   (2014.01)
*H04N 19/61*   (2014.01)

(52) U.S. Cl.
CPC ............ *G06T 9/00* (2013.01); *H04N 19/00309* (2013.01); *H04N 19/00781* (2013.01)

(58) Field of Classification Search
CPC ................. H04N 19/00309; H04N 19/00781; G06T 9/00

USPC ........... 345/419, 428; 382/238, 239, 245, 246
See application file for complete search history.

(56) References Cited

U.S. PATENT DOCUMENTS

| | | | |
|---|---|---|---|
| 6,339,618 B1 | 1/2002 | Puri et al. | |
| 6,525,722 B1 * | 2/2003 | Deering | 345/419 |
| 7,466,867 B2 * | 12/2008 | Sung et al. | 382/246 |
| 7,573,474 B2 * | 8/2009 | Hoppe et al. | 345/423 |
| 7,983,500 B2 * | 7/2011 | Zeng et al. | 382/245 |
| 8,306,344 B2 * | 11/2012 | Mizuno et al. | 382/239 |
| 8,417,044 B2 * | 4/2013 | Cho et al. | 382/238 |

(Continued)

FOREIGN PATENT DOCUMENTS

| | | |
|---|---|---|
| KR | 10-2000-0016837 | 3/2000 |
| KR | 10-2000-0016872 | 3/2000 |

(Continued)

OTHER PUBLICATIONS

Boon-Seng Chew et al, "Bitplane Coding Technique for 3-D Animated Meshes", Neural Networks and Signal Processing, 2008 International Conference On, IEEE, Piscataway, NJ, USA, Jun. 7, 2008, pp. 692-695.

Extended European Search Report issued Jun. 12, 2013 in corresponding European Patent Application No. 11174507.1.

*Primary Examiner* — Phu K Nguyen
(74) *Attorney, Agent, or Firm* — NSIP Law

(57) ABSTRACT

A scalable three-dimensional (3D) mesh encoding method includes dividing the 3D mesh into layers of complexity into a plurality of graduated levels and generating vertex position information and connectivity information of each of the plurality of levels. The vertex position information about the 3D mesh is encoded based on a weighting in each bit plane and vertex position information having a higher weighting in each bit plane is first encoded.

16 Claims, 10 Drawing Sheets

(56) References Cited

U.S. PATENT DOCUMENTS

| | | | | |
|---|---|---|---|---|
| 8,860,719 | B2 * | 10/2014 | Ahn et al. | 345/420 |
| 2006/0115166 | A1 | 6/2006 | Sung et al. | |
| 2006/0181536 | A1 | 8/2006 | Ostermann et al. | |

FOREIGN PATENT DOCUMENTS

| | | |
|---|---|---|
| KR | 10-2000-0028583 | 5/2000 |
| KR | 10-2001-0091928 | 10/2001 |
| KR | 10-2001-0105361 | 11/2001 |

* cited by examiner

PART OF LEVEL i-1

PART OF LEVEL i

PART OF LEVEL i-1

PART OF LEVEL i

FIG. 7

| SIGN | + | + | - | + | - | + | - | - | + |
|------|---|---|---|---|---|---|---|---|---|
| MSB  | 1 | 0 | 1 | 1 | 0 | 0 | 0 | 0 | 0 |
|      | 1 | 1 | 0 | 1 | 1 | 0 | 0 | 0 | 0 |
|      | 1 | 1 | 0 | 0 | 1 | 1 | 1 | 0 | 0 |
|      | 1 | 1 | 1 | 0 | 1 | 0 | 0 | 1 | 0 |
| LSB  | 1 | 0 | 0 | 0 | 0 | 0 | 1 | 1 | 1 |
|      | 31| 14|-18| 24|-14| 4 | -5| -3| 1 |

1st CLUSTER

2nd CLUSTER

FIG. 8

|  | 1st BIT-PLANE MSB : 5 | | | 2nd BIT-PLANE MSB : 4 | | | 3rd BIT-PLANE MSB : 2 | | |
|---|---|---|---|---|---|---|---|---|---|
| SIGN | + | + | − | + | − | + | − | − | + |
| MSB | 1 | 0 | 1 | 0 | 0 | 0 | 0 | 0 | 0 |
|  | 1 | 1 | 0 | 1 | 1 | 0 | 0 | 0 | 0 |
|  | 1 | 1 | 0 | 0 | 1 | 1 | 0 | 0 | 0 |
|  | 1 | 1 | 1 | 0 | 1 | 0 | 1 | 1 | 0 |
| LSB | 1 | 0 | 0 | 0 | 0 | 0 | 0 | 1 | 1 |
|  | 31 | 14 | −18 | 8 | −14 | 4 | −2 | −3 | 1 |

APPARATUS AND METHOD OF SCALABLE ENCODING OF 3D MESH, AND APPARATUS AND METHOD OF SCALABLE DECODING OF 3D MESH

CROSS-REFERENCE TO RELATED APPLICATIONS

This application claims the priority benefit of Korean Patent Application No. 10-2010-0069581, filed on Jul. 19, 2010, in the Korean Intellectual Property Office, the disclosure of which is incorporated herein by reference.

BACKGROUND

1. Field

Example embodiments relate to an apparatus and a method of scalable encoding of a 3D mesh and an apparatus and a method of scalable decoding of a 3D mesh.

2. Description of the Related Art

A 3D mesh to restore a 3D object uses a high-capacity storage space, a great number of calculations, and a wide transmission bandwidth. In order to effectively transmit, store, and render the 3D object, the 3D mesh is encoded and compressed.

When a 3D object is complex, a 3D mesh also has a complex form. In order to restore the 3D object, all information forming the 3D mesh is transmitted to a decoding apparatus, which is defined as a single-bit rate compression.

In a conventional single-bit rate compression, vertex position information about vertices forming a 3D mesh is sequentially transmitted. Thus, after all vertex position information is transmitted, a 3D object may be restored.

SUMMARY

The foregoing and/or other aspects are achieved by providing a scalable three-dimensional (3D) mesh encoding apparatus including a 3D mesh simplifier to divide layers of complexity of a 3D mesh into a plurality of graduated levels and to generate vertex position information and connectivity information about each of the plurality of levels, a weighting calculator to calculate a weighting of the vertex position information, and a 3D mesh encoder to encode the 3D mesh based on the weighting of the vertex position information.

The foregoing and/or other aspects are achieved by providing a 3D mesh decoding apparatus including a bit stream receiver to receive an encoded bit stream having connectivity information and vertex position information about a 3D mesh, and an object restoring unit to decode the bit stream and to restore a 3D object corresponding to the 3D mesh based on the connectivity information and vertex position information.

The foregoing and/or other aspects are achieved by providing a scalable 3D mesh encoding method including dividing, by at least one processor, layers of complexity of a 3D mesh into a plurality of graduated levels and generating vertex position information and connectivity information about each of a plurality of levels, calculating, by the at least one processor, a weighting of the vertex position information, and encoding, by the at least one processor, the 3D mesh based on the weighting of the vertex position information.

The foregoing and/or other aspects are achieved by providing a scalable 3D mesh decoding method including receiving, by at least one processor, an encoded bit stream having connectivity information and vertex position information about a 3D mesh, and decoding, by the at least one processor, the bit stream and restoring a 3D object corresponding to the 3D mesh based on the connectivity information and vertex position information.

The foregoing and/or other aspects are achieved by providing an apparatus to process a bit stream including connectivity information and vertex position information about a plurality of vertices forming a 3D mesh, the connectivity information is arranged based on a level, and the vertex position information arranged based on a weighting of the vertices in each bit plane.

The foregoing and/or other aspects are achieved by providing a method, including assigning, by at least one processor, each of a plurality of vertices to at least one of a plurality of levels of complexity of a 3D mesh corresponding to a 3D object, the plurality of levels arranged from less complex to more complex, generating, by the at least one processor, vertex position information and connectivity information for each of the plurality of vertices for each of the plurality of levels and encoding, by the at least one processor, the 3D mesh.

The foregoing and/or other aspects are achieved by providing a method, including arranging, by at least one processor, a 3D mesh of a 3D object into a plurality of discrete levels progressively increasing in complexity based on a level number ranging from 0 to n, n being a positive integer, each level having a larger number of vertices and more complex connectivity between the vertices than a previous level and encoding, by the at least one processor, the 3D mesh according to plurality of levels.

The example embodiments may use a progressive encoding method in which a 3D mesh may be divided into layers of complexity, and meshes may be encoded into simple mesh according to a lower level and into a complex mesh according to a higher level. Thus, the 3D mesh may be substantially similar to an original but may be represented with less information.

The example embodiments may also minimize a difference from an original while only requiring the same amount of transmission data by encoding vertex position information of a 3D mesh based on a weighting in each bit plane.

According to another aspect of one or more embodiments, there is provided at least one non-transitory computer readable medium including computer readable instructions that control at least one processor to implement methods of one or more embodiments.

Additional aspects, features and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of embodiments, taken in conjunction with the accompanying drawings of which:

FIG. 7 illustrates a process of encoding vertex position information about a 3D mesh according to example embodiments;

FIG. 8 illustrates a process of dividing and encoding vertex position information about a 3D mesh according to example embodiments;

DETAILED DESCRIPTION

Figure 1:
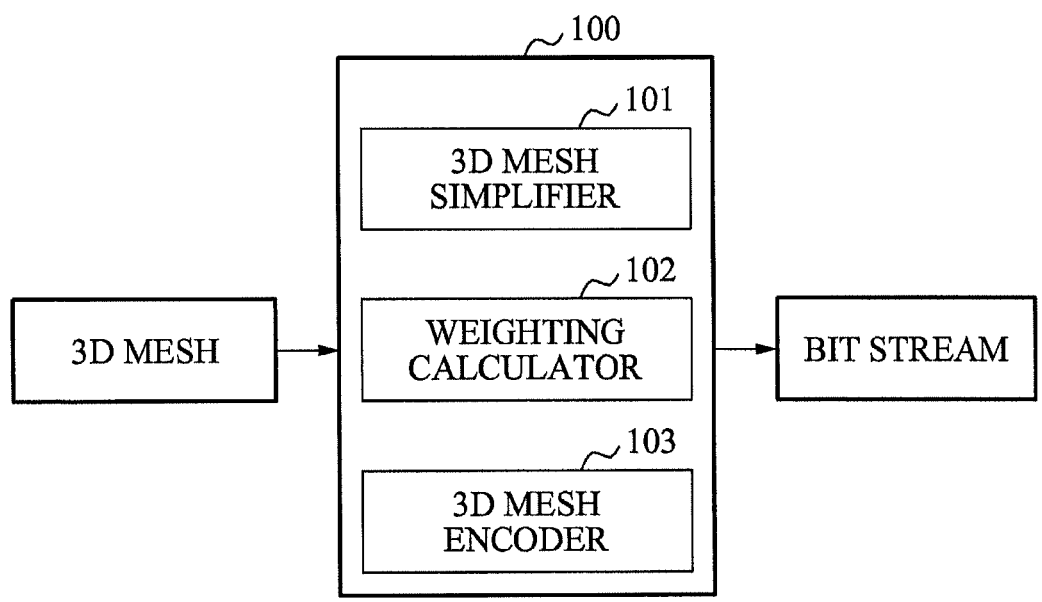
FIG. 1 is a block diagram of a configuration of a scalable 3D mesh encoding apparatus according to example embodiments.

Reference will now be made in detail to embodiments, examples of which are illustrated in the accompanying drawings, wherein like reference numerals refer to like elements throughout. Embodiments are described below to explain the present disclosure by referring to the figures. A scalable three-dimensional (3D) mesh encoding method according to example embodiments may be performed by a scalable 3D mesh encoding apparatus. A scalable 3D mesh decoding method according to example embodiments may be performed by a scalable 3D mesh decoding apparatus.

FIG. 1 is a block diagram of a configuration of a scalable 3D mesh encoding apparatus 100 according to example embodiments.

Referring to FIG. 1, the scalable 3D mesh encoding apparatus 100 may include a 3D mesh simplifier 101, a weighting calculator 102, and a 3D mesh encoder 103.

The 3D mesh simplifier 101 may simplify a 3D mesh corresponding to a 3D object to generate vertex position information and connectivity information according to each of a plurality of levels.

The vertex position information may be represented by geometric information and indicate a 3D positional coordinate of a vertex forming the 3D mesh. In the example embodiments, the vertex position information may indicate a 3D positional coordinate corresponding to a quantized vertex. The connectivity information may indicate relations between vertices. In detail, the connectivity information may indicate a type of a vertex which forms a side.

Further, the 3D mesh simplifier 101 may classify 3D meshes into simple meshes and more complex meshes according to levels. A lower level includes 3D meshes formed by fewer numbers of vertices than a higher level, and a 3D mesh with a lower level may have a simpler form than a 3D mesh with a higher level. In other words, the 3D mesh with a higher level may appear more similar to an original 3D object than the 3D mesh having a lower level.

For example, the 3D mesh simplifier 101 may set connectivity information and vertex position information associated with a base mesh of a 3D mesh according to a level 0. The 3D mesh simplifier 101 may set vertex position information and connectivity information about an additional vertex in order to restore a mesh form to an upper level.

As an example, a 3D mesh in a level 0 may be a tetrahedron formed by four vertices, and a 3D mesh in a level 1 may be a hexahedron formed by eight vertices. In the level 0, connectivity information and vertex position information about the four vertices forming the tetrahedron may be generated. In the level 1, connectivity information and vertex position information about the additional four vertices may be generated in addition to the vertices expressed by the level 0. If a 3D mesh in a level 2 has two more vertices than the 3D mesh in the level 1, connectivity information and vertex position information about the additional two vertices may be generated.

The weighting calculator 102 may calculate a weighting of vertex position information for a 3D mesh. For example, the weighting calculator 102 may calculate a weighting of vertex position information in each bit plane according to the respective levels. A bit plane will be described further with reference to FIG. 4. In the example embodiments, the scalable 3D mesh encoding apparatus 100 may encode vertex position information based on a weighting in each bit plane rather than sequentially in each level.

According to the example embodiments, the weighting calculator 102 may calculate a weighting of vertex position information in each bit plane based on at least one of level information, an extent of a bit plane, and difference information in each level. For example, the weighting calculator 102 may calculate a weighting of vertex position information to be high when bit planes in the same level are closer to a most significant bit (MSB) than a least significant bit (LSB). Further, the weighting calculator 102 may calculate a weighting of vertex position information in each bit plane based on difference information in each level and an extent of a bit plane because bit planes in the vertex position information in different levels have different extents.

The 3D mesh encoder 103 may encode a 3D mesh based on a weighting of vertex position information. For example, the 3D mesh encoder 103 may encode vertex position information based on a weighting in each bit plane. The 3D mesh encoder 103 may encode vertex position information based weighting in each bit plane first regardless of levels.

Further, the 3D mesh encoder 103 may encode connectivity information based on a level. The 3D mesh encoder 103 may encode the connectivity information representing relations between vertices in order of a lower level to a higher level.

The example embodiments may employ a progressive encoding method. A simple 3D mesh may be transmitted first, and then a complex 3D mesh may be transmitted. Moreover, in order to increase progressive characteristics, a scalable encoding method may include encoding vertex position information not as a whole but rather according to a bit plane unit. In particular, the progressive encoding method according to the example embodiments may include determining an encoding order of vertex position information differently based on a weighting in each bit plane, to minimize a difference from an original while minimizing an amount of data transmitted.

Figure 2:
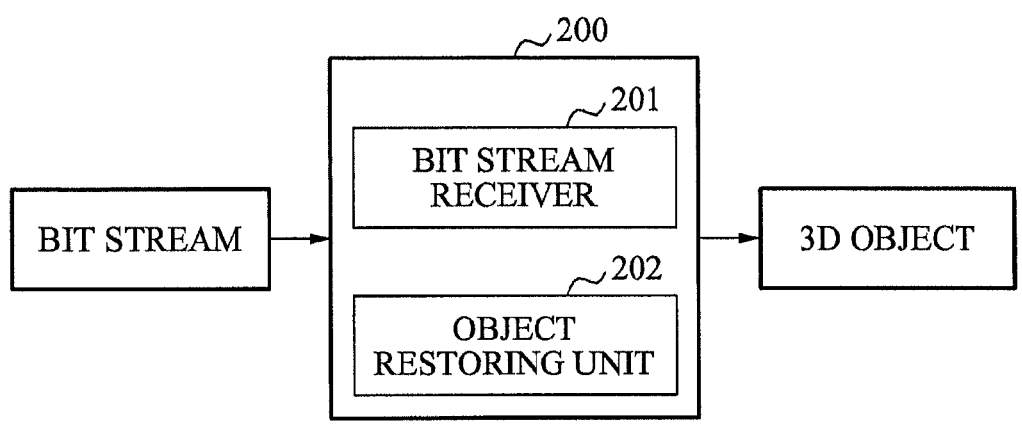
FIG. 2 is a block diagram of a configuration of a scalable 3D mesh decoding apparatus according to example embodiments.

FIG. 2 is a block diagram of a configuration of a scalable 3D mesh decoding apparatus 200 according to example embodiments.

Referring to FIG. 2, the scalable 3D mesh decoding apparatus 200 may include a bit stream receiver 201 and an object restoring unit 202.

The bit stream receiver 201 may receive an encoded bit stream having connectivity information and vertex position information about a 3D mesh from the scalable 3D mesh encoding apparatus 100.

As shown in FIG. 1, in the bit stream, an encoding order of the connectivity information may be determined based on a level, and an encoding order of the vertex position information may be determined based on a weighting in each bit plane.

The object restoring unit 202 may decode the bit stream and restore a 3D object corresponding to the 3D mesh based on the arranged connectivity information and vertex position information. According to example embodiments, 3D meshes from a simple form (according to a lower level) to a progressively complex form (according to a higher level) may be formed depending on levels, allowing a 3D mesh substantially similar to an original to be restored. The object restoring unit 202 may restore the 3D object by applying characteristics information including a color of the mesh, restoration directions, a reflectance, etc. to the 3D mesh. Because vertices forming the 3D mesh are encoded based on a weighting in each bit plane, even vertices forming a 3D mesh in a higher level may be stored prior to vertices forming a 3D mesh in a lower level. However, the connectivity information representing relations between vertices may be restored prior to the vertex position information. The connectivity information may be restored in order of the lower level to the higher level.

Figure 3:
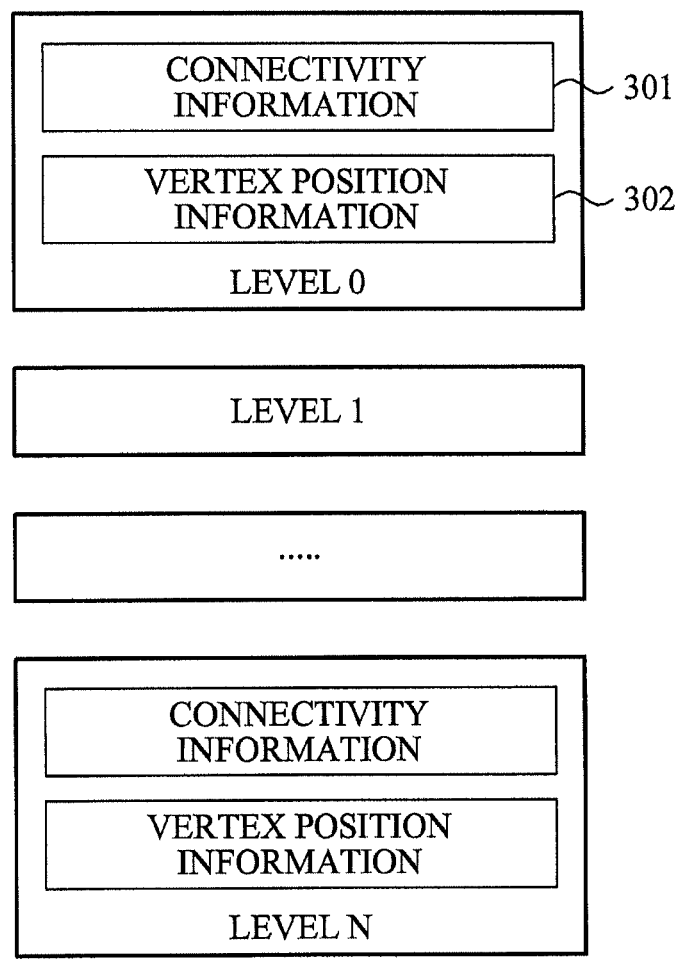
FIG. 3 illustrates a simplified result of a 3D mesh based on a level according to example embodiments.

FIG. 3 illustrates a simplified result of a 3D mesh based on a level according to example embodiments.

Referring to FIG. 3, the 3D mesh corresponding to a 3D object may be divided into connectivity information 301 and vertex position information 302 based on a level. A 3D mesh corresponding to a level 0 may represent a simpler form of the 3D object having fewer vertices than a 3D mesh corresponding to a level 1.

Vertex position information 302 according to level 1 may include information about additional vertices separate from vertex position information about the 3D mesh according to the level 0. The 3D mesh in the level 0 may be formed by vertices v1, v2, v3, and v4, and he 3D mesh in the level 1 may be formed by vertices v1, v2, v3, v4, v5, and v6. The vertex position information 302 in the level 0 may be related to vertices v1, v2, v3, and v4, and the vertex position information 302 in the level 1 may be related to vertices v5 and v6 which are additionally needed to restore the 3D mesh to the level 1. A number of vertices may depend upon a level. Connectivity information 301 in the level 0 may represent relations between the vertices v1, v2, v3, and v4, and connectivity information 301 in the level 1 may represent relations between the vertices v1, v2, v3, v4, v5, and v6.

The scalable 3D mesh encoding apparatus may encode a 3D object and sort 3D meshes based on a level which range from less complex to more complex.

Figure 4:
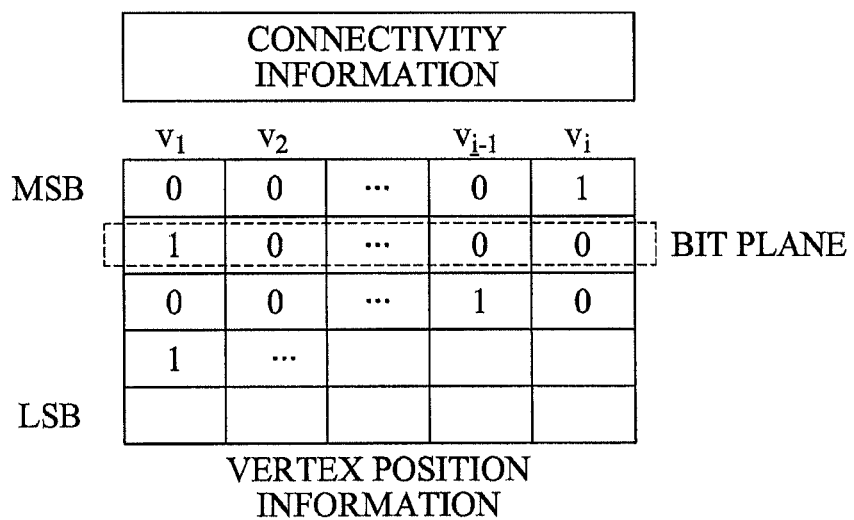
FIG. 4 illustrates vertex position information about a 3D mesh in each bit plane according to example embodiments.

FIG. 4 illustrates vertex position information about a 3D mesh in each bit plane according to example embodiments.

Referring to FIG. 4, the vertex position information about vertices to form the 3D mesh may be expressed in each bit plane. The respective vertices may be represented by $V_1$ to $V_i$ and expressed as bit values ranging from a MSB to a LSB. In FIG. 4, the bit plane may include a bit value of each vertex which forms the 3D mesh.

As described above, a number of vertices may depend on a level. When a 3D mesh in a level 0 is formed by four vertices, a bit plane is may be formed by four vertices. When a 3D mesh in a level 1 is formed by six vertices, a bit plane may be formed by two vertices which are not from the vertices from the previous level. Thus, a weighting of vertex position information in each bit plane may be based on an extent of the bit plane determined differently based on a level.

Figure 5:
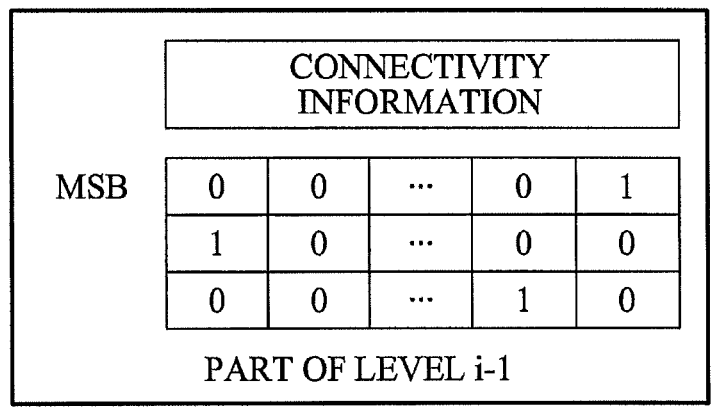
FIG. 5 illustrates an encoded result of vertex position information of a 3D mesh based on a weighting in each bit plane according to example embodiments.
Figure 5:
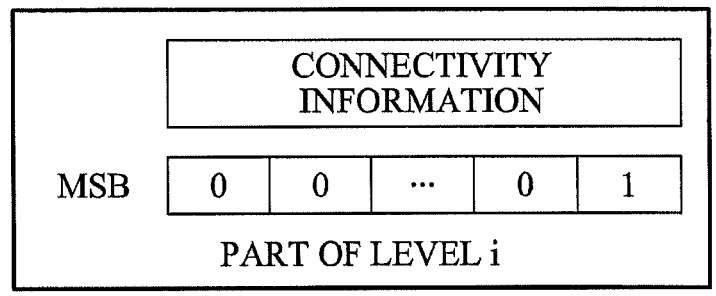
Figure 5:
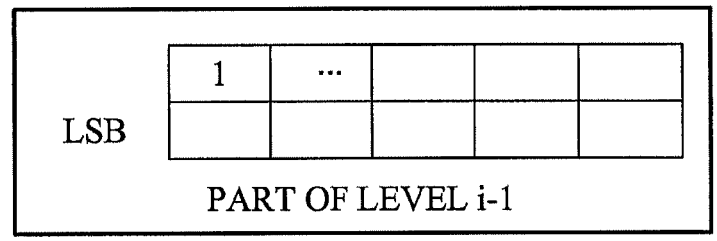
Figure 5:
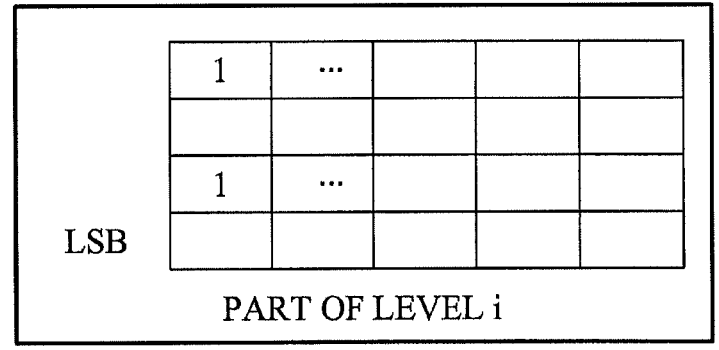

FIG. 5 illustrates an encoded result of vertex position information of a 3D mesh based on a weighting in each bit plane according to example embodiments.

FIG. 5 shows a bit stream generated by encoding the 3D mesh. Connectivity information about vertices may be encoded according to an order of levels. In other words, the scalable 3D mesh encoding apparatus may encode connectivity information between the vertices forming the 3D mesh in order of a lower level to a higher level.

The vertex position information about the vertices may be encoded according to an order of a weighting in each bit plane. As shown in FIG. 5, the vertex position information may be encoded according to an order of a weighting in each bit plane regardless of level. In other words, part of vertex position information about vertices forming a bit plane in a higher level i may be encoded prior to vertex position information about vertices forming a bit plane in a lower level i-1.

For example, weighting of vertex position information may be higher when bit planes in the same level are closer to a MSB than a LSB. Weighting of vertex position information in each bit plane may be calculated based on difference information in each level and an extent of a bit plane because bit planes in the vertex position information in different levels have different extents.

Figure 6:
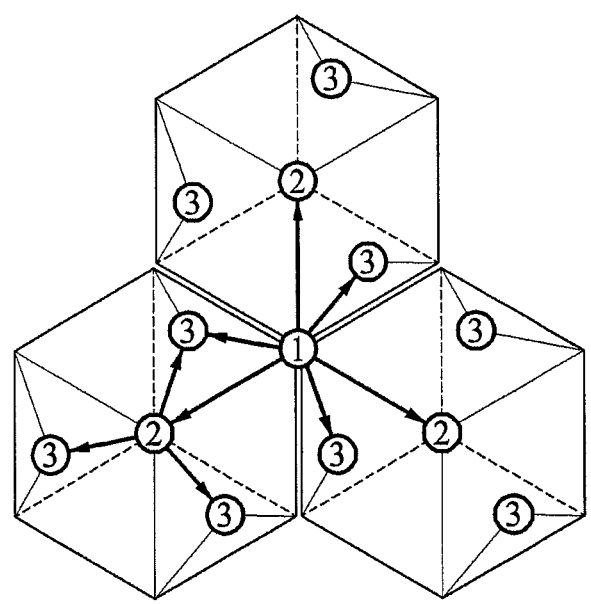
FIG. 6 illustrates weighting of a 3D mesh in each level according to example embodiments.

FIG. 6 illustrates weighting of a 3D mesh in each level according to example embodiments.

As described with reference to FIG. 5, connectivity information about the 3D mesh may be encoded according to an order of levels. A progressive encoding method according to example embodiments may express the 3D mesh in a plurality of levels through a simplification process. In a lower level, the 3D mesh may have fewer vertices while the 3D mesh may have more vertices in a higher level. However, when vertices are restored in the respective levels, the 3D mesh in the higher level may be restored using vertex position information about vertices forming the 3D mesh in the lower level.

As a result, the vertex position information in lower levels is more important than vertex position information in the higher levels. As an example, if the vertex position information about the 3D mesh in a lower level is distorted, then the 3D mesh in a higher level is also distorted. Referring to FIG. 6, when vertex position information about vertices in a level 1 i.e., a lower level is distorted, vertex position information about vertices in the higher level such as a level 2 and a level 3 may also be distorted. Level information may also be needed to calculate a weighting of vertex position information in each bit plane.

The scalable 3D mesh encoding apparatus may encode vertex position information based on a weighting in each bit plane. A bit plane in each level may have a different extent due to a different number of additional vertices in each level. Further, a difference between a 3D object and the 3D mesh may be reduced in higher levels because of additional vertices added to each level. Thus, the scalable 3D mesh encoding apparatus may calculate a weighting of the vertex position information in each bit plane based on level information, an extent of a bit plane, and difference information in levels.

FIG. 7 illustrates a process of encoding vertex position information about a 3D mesh according to example embodiments.

FIG. 7 shows a bit plane having nine vertices expressed in five bits. Vertex position information about each vertex may be represented from a MSB to a LSB and may be encoded in a raster scanning order. A weighting part of the vertex position information may be determined by the MSB. Thus, a weighting of vertex position information of a 3D mesh in each bit plane may be high when the vertex position information is closer to the MSB than the LSB.

As shown in FIG. 7, in order to increase encoding efficiency of the vertex position information, the bit plane may be divided into clusters when the MSB first has a value of 1. In a first cluster, there is a high possibility that bits may have a value of 0 except for bits on a boundary between the first cluster and a second cluster. As a result, encoding efficiency may be improved.

Further, there is a high possibility that bits close to the MSB in the first cluster have a value of 0, and the bits in the first cluster may be divided into m classes based on a bit plane. Thus, the bits in the first cluster may be encoded based on the classes. When the bit plane is encoded based on the clusters, the bits in the first cluster may be minimized and encoded.

FIG. 8 illustrates a process of dividing and encoding vertex position information about a 3D mesh according to example embodiments.

Referring to FIG. 7, a number of bits in the first cluster may be determined by a MSB.

When a MSB of a vertex is extremely high, a number of bits in the first cluster may excessively increase. Thus, the scalable 3D mesh encoding apparatus may divide a bit plane of vertex position information into parts and adaptively control a MSB, so that a number of bits in the first cluster may be minimized to improve encoding efficiency.

In FIG. 8, the scalable 3D mesh encoding apparatus may divide one bit plane into three parts. When encoding begins in a MSB in each divided part, a number of bits in the first cluster may drastically decrease. In particular, a number of bits in the first cluster may decrease from 13 to 4 in a third bit plane as shown in FIG. 8. When the bit plane is divided and encoded, MSB information about a divided position and each divided bit plane may be additionally needed.

Figure 9:
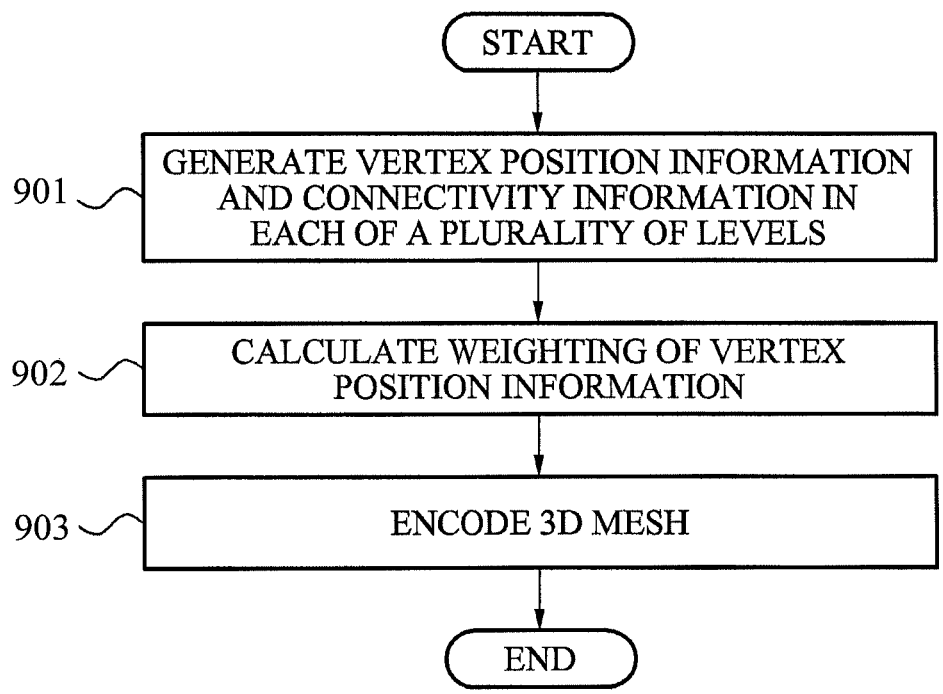
FIG. 9 is a flowchart illustrating a scalable 3D mesh encoding process according to example embodiments.

FIG. 9 shows a flowchart illustrating a scalable 3D mesh encoding process according to example embodiments.

The scalable 3D mesh encoding apparatus 100 may simplify a 3D mesh to generate vertex position information and connectivity information about each of a plurality of levels in 901. For example, the scalable 3D mesh encoding apparatus 100 may set connectivity information and vertex position information associated with a base mesh of the 3D mesh to a level 0. The scalable 3D mesh encoding apparatus 100 may set vertex position information and connectivity information about an additional vertex to restore a mesh form in each level to another level other than level 0.

The scalable 3D mesh encoding apparatus 100 may calculate a weighting of vertex position information 902. For example, the scalable 3D mesh encoding apparatus 100 may calculate a weighting of vertex position information in each bit plane in the respective levels. The scalable 3D mesh encoding apparatus 100 may calculate a weighting of vertex position information based on at least one of level information, an extent of a bit plane, and difference information in each level.

The scalable 3D mesh encoding apparatus 100 may encode a 3D mesh based on a weighting of vertex position information in 903. For example, the scalable 3D mesh encoding apparatus 100 may encode vertex position information about the 3D mesh based on a weighting in each bit plane. The scalable 3D mesh encoding apparatus 100 may encode the vertex information about the 3D mesh in order of a weighting of each bit plane. Further, the scalable 3D mesh encoding apparatus 100 may encode the connectivity information based on levels.

In other words, the scalable 3D mesh encoding apparatus 100 may encode the 3D mesh to generate a bit stream of the vertex position information and the connectivity information. The vertex position information may be arranged based on an order of a weighting of each bit plane and the connectivity information may be arranged according to an order of levels.

Figure 10:
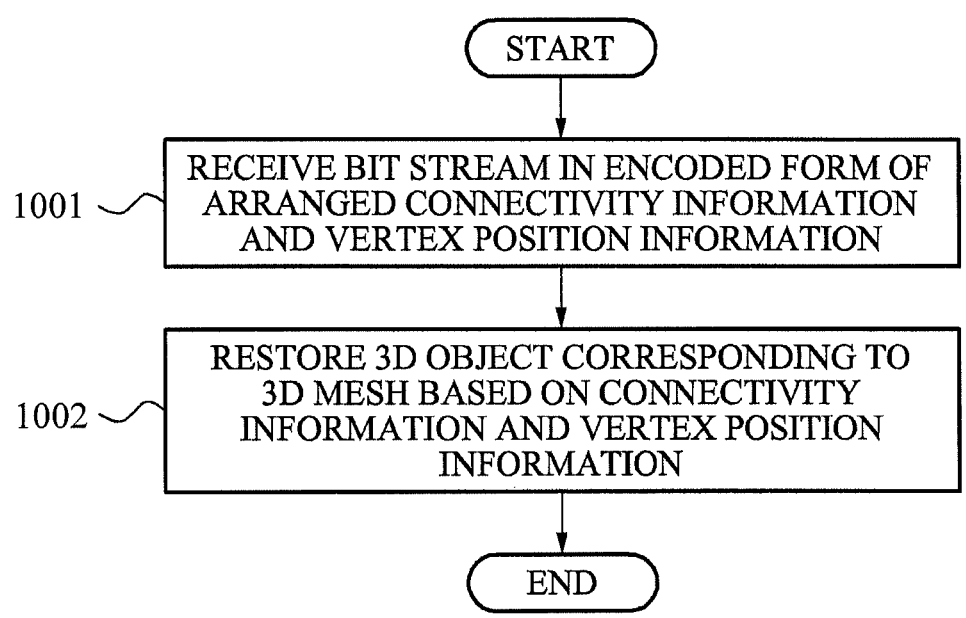
FIG. 10 is a flowchart illustrating a scalable 3D mesh decoding process according to example embodiments.

FIG. 10 is a flowchart illustrating a scalable 3D mesh decoding process according to example embodiments.

The scalable 3D mesh decoding apparatus 200 may receive an encoded bit stream having connectivity information and vertex position information about a 3D mesh in 1001. The bit stream may be encoded data related to connectivity information and vertex position information, the connectivity information arranged in an order of levels and the vertex position information arranged based on a weighting in each bit plane. For example, a weighting in each bit plane may be determined based on at least one of level information, an extent of a bit plane, and difference information in each level.

The scalable 3D mesh decoding apparatus 200 may decode the bit stream and restore a 3D object corresponding to the 3D mesh based on the arranged connectivity information and vertex position information in 1002.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it should be appreciated by those skilled in the art that changes may be made in these embodiments without departing from the principles and spirit of the disclosure, the scope of which is defined by the claims and their equivalents.

What is claimed is:

1. A scalable three-dimensional (3D) mesh encoding apparatus including a processor unit, comprising:
    a 3D mesh simplifier to simplify a 3D mesh and to generate vertex position information and connectivity information about each of a plurality of levels;
    a weighting calculator to calculate a weighting of the vertex position information; and
    a 3D mesh encoder to encode the 3D mesh based on the weighting of the vertex position information,
    wherein the 3D mesh encoder encodes the connectivity information based on a level,
    wherein the weighting calculator calculates a weighting of the vertex position information in each bit plane in the respective levels,
    wherein each bit plane is divided into a first cluster and a second cluster, and
    wherein the first cluster is divided into m classes, m being a positive integer, based on a corresponding bit plane.

2. The apparatus of claim 1, wherein the weighting calculator calculates the weighting of the vertex position information based on at least one of level information, an extent of a bit plane, and difference information in each level.

3. The apparatus of claim 1, wherein the 3D mesh encoder encodes the vertex position information based on the weighting in each bit plane.

4. The apparatus of claim 1, wherein the 3D mesh simplifier sets connectivity information and vertex position information associated with a base mesh of the 3D mesh to a level 0, and sets vertex position information and connectivity information about an additional vertex to restore a mesh form in each level to another level than the level 0.

5. A scalable three-dimensional (3D) mesh decoding apparatus including a processor unit, comprising:
   a bit stream receiver to receive an encoded bit stream having connectivity information based on a level, and vertex position information about a 3D mesh; and
   an object restoring unit to decode the bit stream and to restore a 3D object corresponding to the 3D mesh based on the connectivity information and vertex position information,
   wherein the vertex position information is based on a weighting in each bit plane,
   wherein each bit plane is divided into a first cluster and a second cluster, and
   wherein the first cluster is divided into m classes, m being a positive integer, based on a corresponding bit plane.

6. The apparatus of claim 5, wherein the weighting in each bit plane is determined based on at least one of level information, an extent of a bit plane, and difference information in each level.

7. A scalable three-dimensional (3D) mesh encoding method, comprising:
   simplifying, by at least one processor, a 3D mesh and generating vertex position information and connectivity information about each of a plurality of levels;
   calculating, by the at least one processor, a weighting of the vertex position information; and
   encoding, by the at least one processor, the 3D mesh based on the weighting of the vertex position information,
   wherein the encoding of the 3D mesh encodes the connectivity information based on a level,
   wherein the calculating of the weighting comprises calculating a weighting of the vertex position information in each bit plane in the respective levels,
   wherein each bit plane is divided into a first cluster and a second cluster, and
   wherein the first cluster is divided into m classes, m being a positive integer, based on a corresponding bit plane.

8. The method of claim 7, wherein the calculating of the weighting calculates the weighting of the vertex position information based on at least one of level information, an extent of a bit plane, and difference information in each level.

9. The method of claim 7, wherein the encoding of the 3D mesh encodes the vertex position information about the 3D mesh based on the weighting in each bit plane.

10. The method of claim 7, wherein the generating of the vertex position information and the connectivity information comprises:
    setting connectivity information and vertex position information associated with a base mesh of the 3D mesh to a level 0; and
    setting vertex position information and connectivity information about an additional vertex to restore a mesh form in each level to another level than the level 0.

11. At least one non-transitory computer-readable medium comprising computer readable instructions that control at least one processor to implement the method of claim 7.

12. A scalable three-dimensional (3D) mesh decoding method, comprising:
    receiving, by at least one processor, an encoded bit stream having encoded connectivity information based on a level, and vertex position information about a 3D mesh; and
    decoding, by the at least one processor, the bit stream and restoring a 3D object corresponding to the 3D mesh based on the connectivity information and vertex position information,
    wherein the vertex position information is based on a weighting in each bit plane,
    wherein each bit plane is divided into a first cluster and a second cluster, and
    wherein the first cluster is divided into m classes, m being a positive integer, based on a corresponding bit plane.

13. The method of claim 12, wherein the weighting in each bit plane is determined based on at least one of level information, an extent of a bit plane, and difference information in each level.

14. An apparatus including a processor unit to process a bit stream, wherein the bit stream comprises connectivity information and vertex position information about a plurality of vertices forming a 3D mesh, the connectivity information is encoded and arranged based on a level, and the vertex position information is arranged based on a weighting of the vertices in each bit plane,
    wherein each bit plane is divided into a first cluster and a second cluster, and
    wherein the first cluster is divided into m classes, m being a positive integer, based on a corresponding bit plane.

15. A method, comprising:
    assigning, by at least one processor, each of a plurality of vertices to at least one of a plurality of levels of complexity of a 3D mesh corresponding to a 3D object, the plurality of levels arranged from less complex to more complex;
    generating, by the at least one processor, vertex position information and connectivity information for each of the plurality of vertices for each of the plurality of levels; and
    encoding, by the at least one processor, the 3D mesh,
    wherein the encoding of the 3D mesh encodes the connectivity information based on a level,
    wherein the vertex position information is based on a weighting in each bit plane,
    wherein each bit plane is divided into a first cluster and a second cluster, and
    wherein the first cluster is divided into m classes, m being a positive integer, based on a corresponding bit plane.

16. A method, comprising:
    arranging, by at least one processor, a 3D mesh of a 3D object into a plurality of discrete levels progressively increasing in complexity based on a level number ranging from 0 to n, n being a positive integer, each level having a larger number of vertices and more complex connectivity between the vertices than a previous level; and
    encoding, by the at least one processor, the 3D mesh according to plurality of levels,
    wherein the encoding of the 3D mesh encodes the connectivity information based on a level,
    wherein the 3D mesh is weighted based on a bit plane for each of the plurality of levels,
    wherein each bit plane is divided into a first cluster and a second cluster, and
    wherein the first cluster is divided into m classes, m being a positive integer, based on a corresponding bit plane.

* * * * *